Oct. 7, 1969 H. K. GUMMEL ET AL 3,471,786

TIME SCALED ANALOG MODEL TEST CIRCUIT FOR AN ACTIVE ELEMENT AND METHOD OF MAKING SUCH

Filed May 31, 1967

INVENTORS H. K. GUMMEL
B. T. MURPHY
BY David P. Kelley
ATTORNEY 3,471,786

TIME SCALED ANALOG MODEL TEST CIRCUIT FOR AN ACTIVE ELEMENT AND METHOD OF MAKING SUCH

Hermann K. Gummel, North Plainfield, and Bernard T. Murphy, New Providence, N.J., assignors to Bell Telephone Laboratories, Incorporated, Murray Hill, N.J., a corporation of New York Filed May 31, 1967, Ser. No. 642,445
Int. Cl. G01r 13/02; H03k 13/02
U.S. Cl. 324—158 10 Claims

ABSTRACT OF THE DISCLOSURE

An analog model of the active element in a circuit can be achieved by utilizing the element itself as its DC model and time scaling for the AC model. For a solid state junction device, the charge storage is treated as being both current and voltage controlled. Voltage modeling is achieved by shunting the voltage controlled charge storage areas by properly chosen capacitors. Current modeling is achieved by sampling the AC current and applying a voltage derived therefrom to a properly chosen capacitor.

Background of the invention

In the analysis and design of circuits involving solid state devices as active components, such as integrated circuits, neither digital nor analog techniques have proven completely satisfactory. Where realistic models of the active devices are required, the storage limitations and lengthy execution times of digital computers severely limit the allowable circuit complexity. By the same token, analog computers require operational amplifiers, function generators, multipliers and the like in numbers directly related to the circuit complexity, hence practical limits are placed upon the complexity of the circuits to be analyzed.

In addition to the practical limitations of circuit complexity, relatively speaking both digital and analog computer analyses consume a great deal of time in setting up or programming the analysis and, for digital computers, in the actual program execution itself. Obviously any system of analysis of, for example, a transistor circuit, that produces a material saving in time and that is not, generally speaking, limited to relatively simple circuits, is highly desirable.

Summary of the invention

The present invention comprises a technique and apparatus for analog circuit analysis that utilizes the active element, e.g., a transistor, as its own DC model, and provides for a time scaled modeling of the AC effects.

As is well known, the AC behavior of the transistor and other active elements is conveniently described in terms of stored charge effects. The present invention, in contradistinction to previous analytic methods and apparatus, is based upon the recognition that the stored charge is separable into two components, i.e., a voltage controlled component and a current controlled component, and the recognition that the use of both currents and voltages as the controlling agents of the charge storage leads to simple physical models. These models exhibit at low frequencies, where measurements are easily performed and parasitic effects are avoided, the important AC characteristics of the active elements at high frequencies.

The voltage controlled effects are associated with what are commonly called the transition region capacitances of, for example, the emitter-base and collector-base junctions in a transistor. To a first approximation, leading to the simplest model which is sufficiently accurate for the type of analysis under consideration, the voltage controlled charge depends linearly on the junction voltages. Time scaled modeling of the junction capacitances is achieved by shunting the junctions with capacitances which are equal to the junction capacitance times a time scaling factor.

The current controlled charge is primarily due to excess carriers in transit through the device, and varies substantially linearly with current over a considerable range. It can be appreciated that for a transistor, and equally as well for other active devices, there is a characteristic time parameter, that is a measure of the change in stored charge in the device associated with changes in current. The high frequency capabilities of the device are related to this characteristic time. The present invention provides for a sampling resistor in the circuit of one or several of the leads to the device, such as the base lead of a transistor, across which is generated a voltage proportional to the current in the lead. The voltage thus derived is amplified in an operational amplifier and applied to a capacitance which is connected between the output of the amplifier and the input to the lead under consideration. As will be discussed more fully hereinafter, the time scaled effective lifetime of the device under test is equal to the product of the resistor, the capacitance, and the gain of the amplifier. As a consequence, the charge stored in the capacitor is a direct representation of the current controlled charge in the device under test.

Description of the drawing

The various features and principles of the present invention will be more readily understood from the following detailed description read in conjunction with the drawings, in which.

Detailed description

Figure 1:
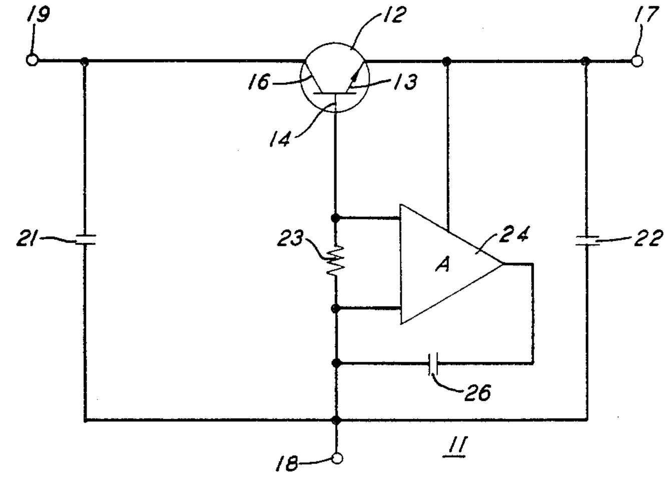
FIG. 1 is a schematic diagram of a first embodiment of the invention.

FIG. 1 depicts the module 11 for an NPN junction transistor 12, which comprises emitter, base, and collector electrodes 13, 14 and 16, respectively, with their respective input terminals 17, 18 and 19. Circuit 11 constitutes a representation of the transistor which is insertable into a model of the circuit in which the transistor 12 is the active element. As pointed out heretofore, it is desirable to utilize time scaling so that high-frequency characteristics and behavior may be observed and measured at low frequencies. To this end, the associated circuitry into which module 11 is connected is preferably time scaled by a factor K, typically $10^4$ to $10^6$. Hence any capacitances $C_m$ and inductances $L_m$ of the associated circuitry become $KC_m$ and $KL_m$. The factor K is chosen on the basis of convenience to achieve ease of measurement and elimination of parasitic effects which occur at high operating frequencies.

Transistor 12 is its own DC model in the module 11. It also is an element in its AC model. However, to achieve an accurate modeling of its AC performance in accordance with the principles of the invention, the charge storage effects must be simulated on the chosen time scale.

The stored charge in a transistor may be considered as consisting of a voltage controlled component and a current controlled component. The voltage controlled component is associated with the transition region capacitances of the emitter and collector junctions. If the capacitance variation with applied voltage is neglected, which can reasonably be done, then the voltage controlled charges are proportional to the junction voltages. In accordance with the principles of the invention, this voltage controlled charge storage component is modeled in the circuit module 11 by capacitors 21 and 22 which are connected in shunt with the collector-base junction and the emitter-base junction. The value of capacitor 21 is $KC_{cb}$ where $C_{cb}$ is the capacitance of the collector-base junction, and the value of capacitor 22 is $KC_{eb}$ where $C_{eb}$ is the capacitance of the emitter-base junction. The junction capacitances are readily ascertainable by known techniques.

The charge consisting of the total stored charge minus the voltage controlled charge varies nearly linearly with current over a considerable range of currents. This charge, Q, consists primarily of excess carriers in transit through the base and collector regions in the arrangement of FIG. 1. This charge storage is modeled in the circuit of FIG. 1 by a current sensing resistor 23, having a value $r_s$, which is small enough not to affect the DC characteristics materially, in series between the base 14 and input 18, an operational amplifier 24, of gain G, for amplifying the voltage across resistor 23, and a capacitor 26, of value $C_s$, to which the output of amplifier 24 is applied. The time scaled charge $Q^*=KQ$ is related to the current $I_b$ flowing through the sampling resistor 23 ($r_s$) by $$I_b=\frac{Q^*}{r_sC_sG} \quad (1)$$

The charge Q is also related to $I_b$ by $$Q=\frac{\beta I_b}{f_t} \quad (2)$$

where $f_t$ is the high frequency cutoff of the transistor, a commonly used parameter determinable by conventional measuring techniques, and $\beta$ is the common emitter current gain of the transistor, also a readily measurable quantity. In time scaling, the charge Q is multiplied by K, while $f_t$ is divided by K. Therefore, combining Equations 1 and 2 and time scaling $$r_sC_sG=\frac{K\beta}{f_t}=K\tau_b=\tau_b^* \quad (3)$$

where $\tau_b$ is the effective lifetime of the transistor, and where $\tau_b^*$ is the time scaled effective lifetime of the current controlled charge in the transistor. Since $\tau_b$ is a parameter determined by the measurable quantities $\beta$ and $f_t$, the values of $r_s$, $C_s$, and G can be chosen to satisfy Equation 3.

The circuit 11 produces a good presentation of the behavior of the transistor in its active region on the basis of four measurements, i.e., $C_e$, $C_c$, $\beta$, and $f_t$. This is marked contrast to previous models used in analog or digital computation where for comparable accuracy as many as thirty parameters have to be measured or represented. The model is virtually exact for the active region, and useful for the saturated region when the frequencies are sufficiently low that redistribution effects can be neglected. At higher frequencies the model is not exact but is a sufficiently close approximation to make it quite useful, especially in view of the simplicity and saving in time.

Figure 2:
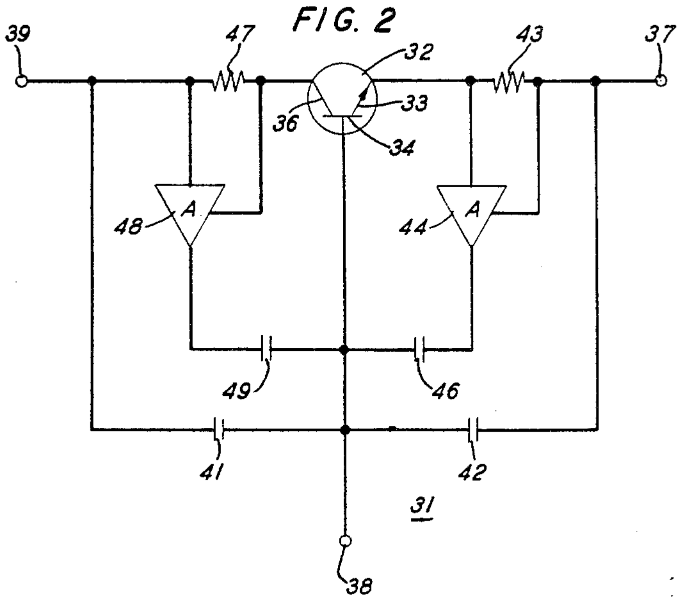
FIG. 2 is a schematic diagram of a second embodiment of the invention.

In FIG. 2 there is depicted schematically a module 31 for modeling the storage of the current carrying charge (electrons in an NPN transistor) that has the advantage of modeling of the redistribution effects, and hence is useful at high frequencies of operation.

The module 31 comprises an NPN junction transistor 32, the device to be modeled, which comprises emitter, base, and collector electrodes 33, 34, and 36, respectively, with their associated input terminals 37, 38, and 39. Module 31, as with module 11 of FIG. 1, is a three terminal model of the transistor, and is insertable into a time scaled model of any circuit in which the transistor 32 is an active element. As in the case of the circuit 11 of FIG. 1, the voltage controlled charge component is modeled in the module 31 by a pair of capacitors 41 and 42 which are connected in shunt with the collector-base junction and the emitter base junction respectively. The value of capacitor 41 is $KC_{cb}$ and that of capacitor 42 is $KC_{eb}$, as in the circuit of FIG. 1.

In the arrangement of FIG. 2, the current controlled charge consists of two components, an emitter portion and a collector portion. The emitter portion is modeled by a sampling resistor 43, an operational amplifier 44 for amplifying the voltage drop across resistor 43, and a capacitor 46 in circuit between amplifier 44 and the base lead. In the same manner, the collector portion of the charge is modeled by resistor 47, amplifier 48, and capacitor 49.

Both $\beta$ and $f_t$ of the transistor are determined by known techniques, as before, and the time scaled effective lifetime $\tau^*$ is given by $$\tau^*=r_1C_1G_1+r_2C_2G_2 \quad (4)$$

where $r_1$ and $r_2$ are the values of resistors 43 and 47, respectively, $C_1$ and $C_2$ are the values of capacitors 46 and 49, respectively, and $G_1$ and $G_2$ the gain of amplifiers 44 and 48, respectively. The circuit of FIG. 2 makes it possible to model the charge redistribution under high-frequency operation. For example, if a fast current pulse is applied between emitter and base terminals, more charge will be stored initially in capacitor $C_1$ relative to capacitor $C_2$, than will be stored for a quiescent case.

In both the circuits of FIG. 1 and FIG. 2, the models may be elaborated by inclusion of controlled amplifier gains, voltage variable capacitors, and the like at the expense of additional complexity. However, the basic principles of the invention, as set forth in the foregoing, remain the same. These principles may be applied in the modeling of other active devices, such as, for example, diodes and field-effect transistors.

The principles of the invention as applied to the modeling of a logic gate comprising an emitter-coupled transistor pair resulted in a circuit operating in the millisecond range as opposed to the nanosecond rate of the actual circuit. Comparisons of waveforms and output voltages produced virtual identity except at the very upper end of the frequency range of operation, where there was a slight mismatch. On the other hand, the programming time for the time scaled circuit of the invention is measured in programmer minutes as opposed to programmer weeks for computer simulation.

The principles of the invention have been illustrated as applied to the modeling of an NPN transistor. These principles may be applied to numerous other types of active elements, such as PNP and field effect transistors and diodes, for example, as well as various other arrangements without departing from the spirit and scope of the invention.

What is claimed is:

1. An analog model of an active element in an AC circuit, the active element being characterized by regions of voltage controlled charge storage and current controlled charge storage, said model comprising the active element itself, means for modeling the voltage controlled charge storage comprising capacitors shunting the voltage controlled charge storage regions, each of said capacitors having a capacitance equal to the capacitance of the region it shunts times a time scaling factor K, and means for modeling the current controlled charge storage comprising a current sampling resistor in series with said element, an amplifier for amplifying the voltage drop across said resistor, and a capacitor in circuit with said element to which the output of the amplifier is applied, said resistor, said amplifier, and said capacitor being related by $$\tau^*=rCG$$

where $r$ is the value of the resistor, C is the capacitance of the capacitor, G is the gain of the amplifier, and $$\tau^*=K\tau$$

where $\tau$ is the effective lifetime of the element, given by $\beta/f_t$ where $\beta$ is the current gain of the element and $f_t$ is the high frequency cutoff of the element.

2. An analog model of an active element as claimed in claim 1 wherein said element is a transistor and said sampling resistor is in series with the base lead of said transistor.

3. An analog model of an active element as claimed in claim 1 wherein said element is a transistor and said sampling resistor is in series with the collector lead of said transistor.

4. An analog model of an active element as claimed in claim 1 wherein said element is a transistor and said sampling resistor is in series with the emitter lead of said transistor.

5. An analog model of an active element as claimed in claim 1 wherein said element is a transistor and there is a current sampling resistor in each of the emitter and collector leads of said transistor.

6. The method of constructing an analog model of an active element for use in an AC circuit wherein said active element is characterized by both voltage and current controlled charge storage regions comprising the steps of measuring the capacitance of the voltage controlled charge storage regions, shunting each of these regions by a capacitor equal to the measured capacitance times a time scaling factor K, measuring the high frequency cutoff of the active element, measuring the current gain of the active element, determining the effective lifetime of the active element by dividing the current gain by the high frequency cutoff of the active element, connecting a current sampling resistor in series with a lead to said device, placing a voltage amplifier across said resistance and a capacitor in series with said amplifier, having selected the resistor, amplifier, and capacitor to satisfy the relationship $$rCG = K\tau$$

where $r$ is the resistance of the resistor, C is the capacitance of the capacitor, G is the gain of the amplifier, and $\tau$ is the effective lifetime of the active element.

7. The method as claimed in claim 6 wherein the active element is a transistor and the resistor is connected in series with the base lead.

8. The method as claimed in claim 6 wherein the active element is a transistor and the resistor is connected in series with the collector lead.

9. The method as claimed in claim 8 wherein an additional resistor, amplifier, and capacitor are placed in circuit with the emitter lead.

10. An analog model of a junction transistor comprising said transistor, a capacitor shunting the emitter-base junction of said transistor and having a capacitance equal to the emitter-base junction capacitance times a time scaling factor K, a capacitor shunting the collector-base junction of said transistor and having a capacitance equal to the collector-base capacitance times the time scaling factor K, a current sampling resistor having a resistance $r_1$ in series with the emitter lead of said transistor, an amplifier having a gain $G_1$ connected across said resistor, a capacitor having a capacitance $C_1$ connected between the amplifier and the base lead of said transistor, a second current sampling resistor having a resistance $r_2$ in series with the collector of said transistor, an amplifier having a gain $G_2$ connected across said second resistor, and a capacitor having a capacitance $C_2$ connected between the second mentioned amplifier and the base lead of said transistor, parameters $r_1$, $r_2$, $G_1$, $G_2$, $C_1$, and $C_2$ being chosen to satisfy the relationship $$r_1C_1G_1 + r_2C_2G_2 = K\tau$$

where $\tau$ is the effective lifetime of the transistor, given by the expression $$\tau = \beta / f_t$$

where $\beta$ is the common emitter current gain of the transistor and $f_t$ is the high frequency cutoff of the transistor.

References Cited

UNITED STATES PATENTS 3,312,899 4/1967 Blanc ............ 324—158

RUDOLPH V. ROLINEC, Primary Examiner

E. L. STOLARUN, Assistant Examiner

U.S. Cl. X.R.

307—300; 35—19